United States Patent [19]

Chatham

[11] Patent Number: 5,271,303
[45] Date of Patent: * Dec. 21, 1993

[54] STRIPPER PLATE RETAINING RING

[75] Inventor: Stephen K. Chatham, Rushville, N.Y.

[73] Assignee: Strippit, Inc., Akron, N.Y.

[*] Notice: The portion of the term of this patent subsequent to Jul. 7, 2009 has been disclaimed.

[21] Appl. No.: 873,395

[22] Filed: Apr. 24, 1992

Related U.S. Application Data

[63] Continuation-in-part of Ser. No. 558,096, Jul. 26, 1990, Pat. No. 5,127,293.

[51] Int. Cl.⁵ .................. B21D 45/08; B26D 7/18
[52] U.S. Cl. .................................... 83/136; 83/140; 83/698; 29/466; 29/468; 403/319; 403/335
[58] Field of Search .................. 83/698, 136, 138, 139, 83/140, 141, 142, 143, 684, 685, 686; 29/453, 464, 465, 468, 469, 466; 403/319, 335, 348, 349

[56] References Cited

U.S. PATENT DOCUMENTS

| | | | |
|---|---|---|---|
| 3,079,824 | 3/1963 | Schott | 83/140 |
| 3,335,627 | 8/1967 | Smelts | 83/140 |
| 3,540,339 | 11/1970 | Killaly | 83/140 |
| 3,935,771 | 2/1976 | Cady, Jr. | 83/140 |
| 4,041,817 | 8/1977 | Nelson | 83/139 |
| 4,113,227 | 9/1978 | Cigliano | 403/316 X |
| 4,121,893 | 9/1978 | Morissette | 403/143 |
| 4,248,111 | 2/1981 | Wilson et al. | 83/140 |
| 4,261,237 | 4/1981 | DiDonato, Jr. et al. | 83/139 |
| 4,446,767 | 5/1984 | Wilson | 83/136 |
| 4,989,484 | 2/1991 | Johnson et al. | 83/140 |
| 5,056,391 | 10/1991 | Stewart | 83/139 |

*Primary Examiner*—Eugenia Jones
*Attorney, Agent, or Firm*—Hill, Steadman & Simpson

[57] ABSTRACT

A device for selectively securing a stripper assembly on a punch guide assembly. A resiliently biased plunger is disposed adjacent the guide assembly, and selectively maintains the stripper assembly in a predetermined rotational position relative to the guide assembly. The stripper assembly includes at least one retaining projection, and the guide assembly includes at least one flange for selective engagement with the retaining projection to secure the stripper assembly and the guide assembly against relative axial movement. A method is disclosed including the steps of placing the stripper assembly on the guide assembly, and affecting relative movement between the stripper assembly and the guide assembly to cause the retaining projection to engage the flange, and the plunger to be received in a locator slot on the stripper assembly.

20 Claims, 2 Drawing Sheets

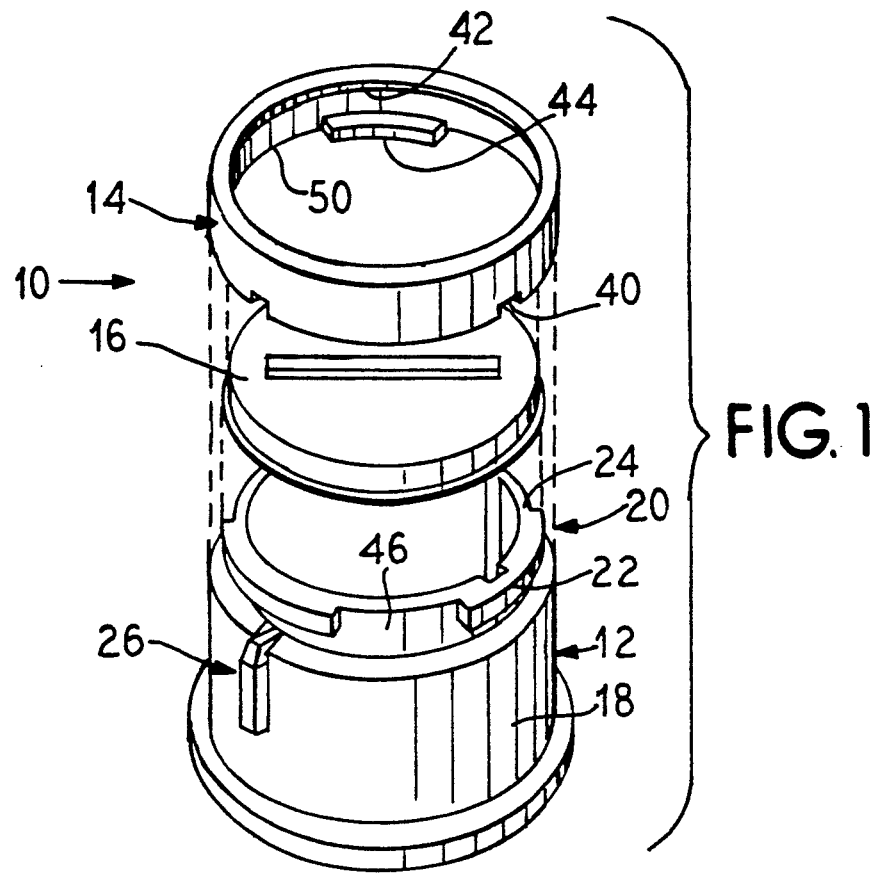
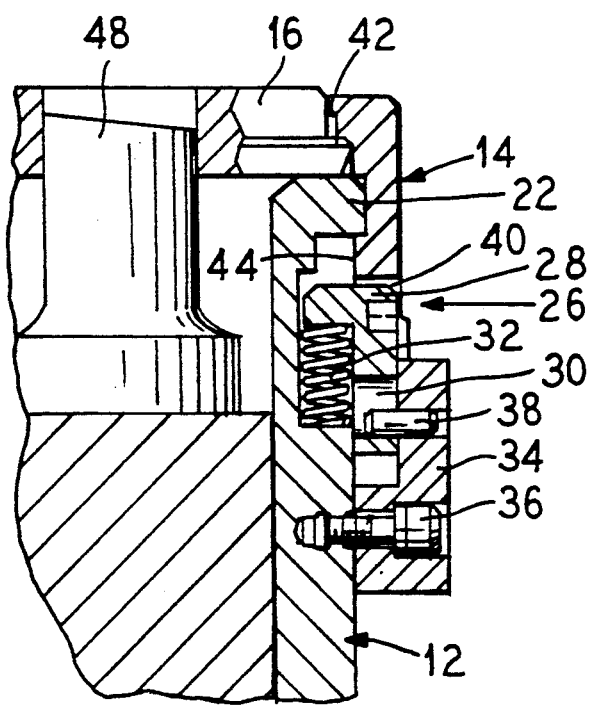

STRIPPER PLATE RETAINING RING

This application is a continuation-in-part of application Ser. No. 558,096 filed Jul. 26, 1990 now U.S. Pat. No. 5,127,293.

TECHNICAL FIELD

The present invention relates to a method and apparatus for removal and installation of a stripper plate on a punch guide assembly.

BACKGROUND OF THE INVENTION

Metal punching devices, particularly sheet metal punching devices, frequently utilize punching tools which are carried by punch guide assemblies. Stripping devices such as stripper plates are often used in association with such punching tools to ensure that punched material is stripped from the punch tip. It is desirable, in certain punching applications, to facilitate the installation and removal of different punching tools having varying shapes within a single guide assembly.

One known way of retaining a stripper plate to a guide assembly is with the use of a wire split locking ring and screw combination, as disclosed in U.S. Pat. No. 4,446,767. In this device, the operator places the stripper plate inside the guide assembly, and then compresses the split locking-ring while seating the ring in a groove inside the guide assembly. Once the ring is seated into the groove, the operator uses a wrench to install a special screw between the two ends of the locking ring. If the locking ring is not seated correctly, the ring and stripper plate are susceptible to dislodging from the guide assembly during operation of the punch, with a potential for damage to the tool and to the punching machine. In order to remove the stripper plate, the installation process is reversed.

Another known alternative is one employed by Cole Engineered Tools (C. P. E. Tooling, Inc.). This design includes a stripper plate retaining device using a machined pocket and a ball detent as a rough locator of the stripper plate. The punch is lowered into the stripper plate, and actually holds the stripper in the pocket. In this device, the punch must first be removed in order to install or remove the stripper plate. Depending on the tool design for removing the punch from the stripper plate, this usually entails at least partial disassembly of the guide assembly.

It is therefore apparent that there exists a need for a device that will provide quick and easy removal and installation of a stripper plate on a punch guide assembly, which also provides a positive locking mechanism to assure stripper plate retention during use.

SUMMARY OF THE INVENTION

The present invention provides a device and method for selectively securing a stripper plate on a punch guide assembly that obviates the shortcomings of known devices and methods. In one embodiment, the device includes a retaining ring adapted to retain the stripper plate on the guide assembly. A resiliently biased plunger is disposed adjacent the guide assembly, and selectively maintains the retaining ring in a predetermined rotational position relative to the guide assembly. The retaining ring includes at least one locator slot that is adapted to receive the plunger. The locator slot is capable of alignment with the plunger by relative rotation between the retaining ring and the guide assembly.

The retaining ring includes at least one retaining projection, and the guide assembly includes at least one flange for selective engagement with the retaining projection surface to secure the retaining ring and the guide assembly against relative axial movement. Relative rotation between the guide assembly and the retaining ring affect engagement of the flange with the retaining projection.

The plunger can be mounted on the guide assembly by means of a key member that is secured to the guide assembly with a key pin. A dowel extends through the key member and into a longitudinal aperture in the plunger. A spring is mounted to bias the plunger toward engagement with a locator slot that extends into the retaining ring.

In one embodiment, the guide assembly is provided with three flanges, and the retaining ring is provided with three retaining projections. The flanges and retaining projections are regularly spaced at approximately 120° intervals.

In another embodiment, the need for a retaining ring is eliminated by the provision of a one-piece stripper assembly including a planar portion, with an annular portion extending therefrom. The annular portion includes at least one retaining projection, and also includes at least one locator slot.

Other objects and advantages of the present invention will become apparent upon reference to the accompanying description when taken in conjunction with the following drawings.

BRIEF DESCRIPTION OF THE DRAWINGS

FIG. 1 is an exploded assembly of a device embodying the present invention.

FIG. 2 is a sectional view, partially broken-away of the FIG. 1 device.

DESCRIPTION OF THE PREFERRED EMBODIMENTS

Figure 4:
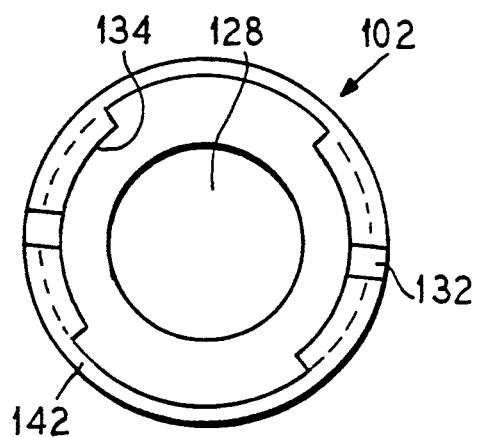
FIG. 4 is an elevational view of the underside of the stripper assembly of FIG. 3.

FIG. 1 shows a device 10 embodying the present invention. The device includes a guide assembly 12 and a retaining ring 14, between which are secured a stripper plate 16.

The guide assembly 12 includes a generally cylindrical body 16 from which extends a cylindrical receiving portion 20. A plurality of flanges 22 are disposed at regular intervals around the outer periphery of the receiving portion 20. In the illustrated embodiment, three flanges 22 are spaced at approximately 120° about the outer periphery of the guide assembly 12. The guide assembly 12 terminates in an abutment surface 24, upon which the stripper plate 16 may be received.

A plunger assembly 26 is mounted on the guide assembly 12, and can be seen in sectional detail in FIG. 2. The plunger assembly 26 includes a plunger 28 in which is formed a longitudinally extending aperture 30. The plunger 28 is selectively reciprocable, and is biased upwardly by a spring 32. The plunger 28 is secured with respect to the guide assembly 12 by an external key member 34. The key member 34 is secured to the guide assembly 12 with a suitable fastener, such as a key pin 36. A dowel 38 extends through the key member 34 and into the aperture 30 of the plunger 28, in order to mount the plunger on the key and to define the limits of reciprocation for the plunger.

The retaining ring 14 is in the form of an annular, generally cylindrical wall. A plurality of locator slots extend axial into, and radially through, the retaining ring 14 at regular intervals. The locator slots 40 are adapted to receive the plunger 28, as will be described in detail hereinafter.

An annular lip 42 is provided along the inner periphery of the upper edge of the retaining ring 14. A plurality of retaining projections 44 extend inwardly from the lower inner peripheral edge of the retaining ring 14. The retaining projections 44 are provided at regular angular intervals corresponding to the placement of the flanges 22 on the guide assembly 12 and have widths less than the widths of space 46 between the flanges 22.

The method of installing the present device may be described as follows. First, the stripper plate 16 corresponding to a punch 48 is placed on the abutment surface 24 of the guide assembly 12. Next, the retaining ring 14 is placed over the stripper plate 16, with the retaining projections 44 passing through the spaces 46 between the flanges 22. Such placement causes a lower surface 50 of the retaining ring 14 to depress the plunger 28.

Next, relative rotation is affected between the retaining ring 14 and the guide assembly 12, causing the retaining projections 44 to slide beneath, and into engagement with, the flanges 22. Relative rotation is continued until one of the locator slots 40 is positioned above the plunger 28, at which time the biasing force of the spring 3 forces the plunger 28 into the locator slot 40.

In its installed position, the stripper plate 16 is secured between the annular lip 42 of the retaining ring 14 and the abutment surface 24 of the guide assembly 12. Engagement between the retaining projections 44 and the flanges 22 prevents relative axial movement of the retaining ring 14 and the guide assembly 12. Relative rotational movement between the guide assembly 12 and the retaining ring 14 is prevented when the plunger 28 is received in one of the locator slots 40.

In order to remove the stripping plate from the assembly, the plunger 28 is manually actuated to a position out of the locator slot in which it is received, and the retaining ring and guide assembly are rotated to bring the retaining projections out of engagement with the flanges. At this point, the retaining ring 14 may be lifted off of the stripper plate 16, and the stripper plate may be removed from the guide assembly.

Figure 3:
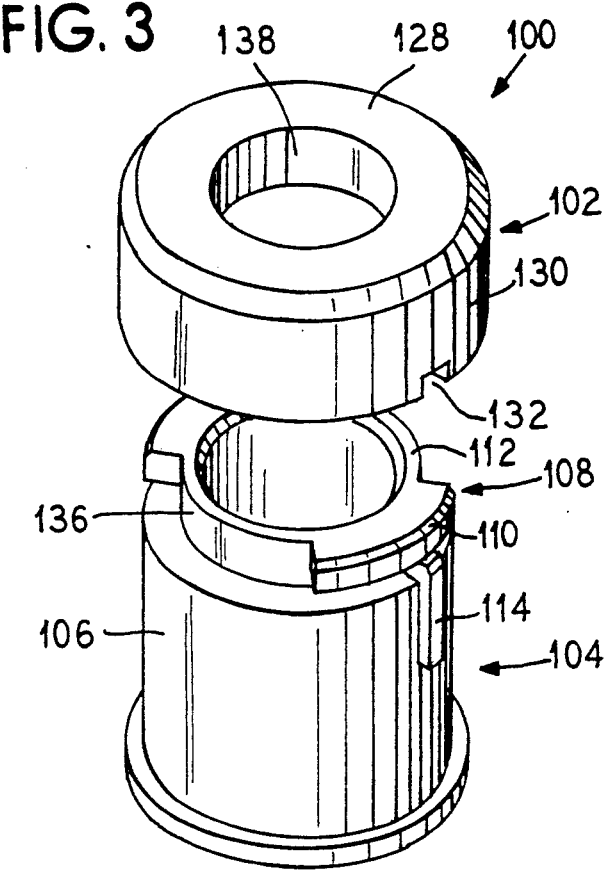
FIG. 3 is an exploded assembly of another device embodying the present invention.

FIG. 3 shows a device 100 embodying the present invention, in which the need for a retaining ring has been eliminated. The device 100 includes a stripper assembly 102 that is adapted to be secured to a guide assembly 104.

The guide assembly 104 includes a generally cylindrical body 106 from which extends a cylindrical receiving portion 108. A plurality of flanges 110 are disposed at regular intervals around the outer periphery of the receiving portion 108. The embodiment illustrated in FIG. 3 shows two flanges 110 that are diametrically opposed from one another about the outer periphery of the guide assembly 104. The guide assembly 104 terminates in an abutment surface 112, upon which the stripper assembly 102 may be received.

Figure 5:
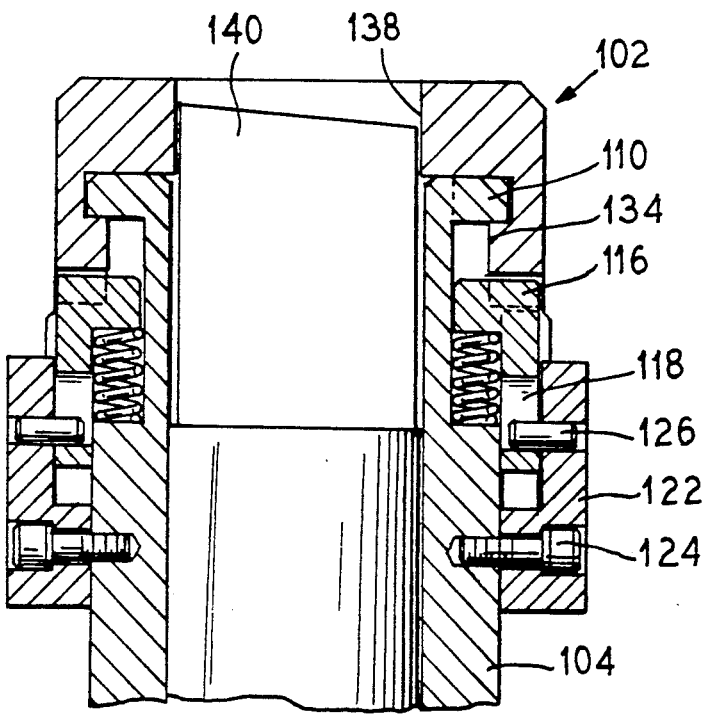
FIG. 5 is a sectional view, partly broken-away, of the FIG. 3 device.

A plunger assembly 114 is mounted on the guide assembly 104, and can be seen in sectional detail in FIG. 5. The plunger assembly 114 includes a plunger 116 in which is formed a longitudinally extending aperture 118. The plunger 118 is selectively reciprocable in a direction substantially parallel to a longitudinal axis of the guide assembly 104, and is biased upwardly by a spring 120. The plunger 116 is secured with respect to the guide assembly 104 by an external key member 122. The key member 122 is secured to the guide assembly 12 with a suitable fastener, such as a key pin 124. A dowel 126 extends through the key member 122 and into the aperture 118 of the plunger 116, in order to mount the plunger on the key and to define the limits of reciprocation for the plunger.

As can be seen in FIGS. 3 and 4, the stripper assembly 102 includes a planar portion 128 from which extends an annular portion 130. A plurality of locator slots 132 extend axially into, and radially through, the annular portion 130 at regular intervals. The locator slots 132 are adapted to receive the plunger 116, as will be described in detail hereinafter.

A plurality of retaining projections 134 extend inwardly from the annular portion 130 of the stripper assembly 102. The retaining projections 134 are provided at regular intervals corresponding to the placement of the flanges 110 on the guide assembly 104, and have widths less than the widths of spaces 136 between the flanges 110.

The planar portion 128 of the stripper assembly 102 includes a punch aperture 138 that is adapted to allow a punch 140 to pass therethrough (see FIG. 5). The method of installing the stripper assembly 102 onto the guide assembly 104 is as follows. First, the stripper assembly 102 is placed over the guide assembly 104, with the retaining projections 134 passing through the spaces 136 between the flanges 110. Such placement causes a lower surface 142 of the stripper assembly 102 to depress the plunger 116.

Next, relative rotation is affected between the stripper assembly 102 and the guide assembly 104, causing the retaining projections 134 to slide beneath, and into engagement with, the flanges 110. Relative rotation is continued until one of the locator slots 132 is positioned above the plunger 116, at which time the biasing force of the spring 120 forces the plunger 116 into the locator slot 132.

In the installed position, engagement between the retaining projections 134 and the flanges 11 prevents relative axial movement between the stripper assembly 102 and the guide assembly 104. Relative rotational movement between the stripper assembly 102 and the guide assembly 104 is prevented when the plunger 116 is received in one of the locator slots 132.

In order to remove the stripper assembly 102 from the guide assembly 104, the plunger 116 is manually actuated to a position out of engagement with the locator slot 132 in which it is received, and the stripper assembly 102 is rotated with respect to the guide assembly 104 to bring the retaining projections 134 out of engagement with the flanges 110, and into alignment with the spaces 136. At this point, the stripper assembly 102 may be lifted off of the guide assembly 104, and removed therefrom.

The embodiment shown in FIGS. 3 through 5 represents the best mode of practicing the invention currently contemplated by the inventors, since the one-piece stripper assembly 102 eliminates the need for a separate retaining ring, thus reducing the overall number of parts.

Although the present invention has been described with reference to a specific embodiment, those of skill in the art will recognize that changes may be made thereto without departing from the scope and spirit of the invention as set forth in the appended claims.

I claim as my invention:

1. A device for selectively securing a stripper assembly on a punch guide assembly, said device comprising:
   a stripper assembly;
   resiliently biased plunger means, disposed adjacent said guide assembly, for selectively maintaining said stripper assembly in a predetermined rotational position relative to said guide assembly, said plunger means being reciprocable in a direction substantially parallel to a longitudinal axis of said guide assembly; and
   at least one locator slot extending into a surface of said stripper assembly, said locator slot being adapted to receive said plunger means when said locator slot is aligned with said plunger means by relative rotation between said stripper assembly and said guide assembly;
   whereby engagement of said plunger means in said locator slot prevents relative rotation of said guide assembly with respect to said stripper assembly.

2. A device according to claim 1, wherein said plunger means is manually actuable.

3. A device according to claim 1, wherein:
   said stripper assembly comprises at least one retaining surface; and
   said guide assembly comprises at least one flange means for selective engagement with said at least one retaining surface to secure said stripper assembly and said guide assembly against relative axial movement.

4. A device according to claim 3, wherein said guide assembly and said stripper assembly are mounted for relative rotation to affect engagement of said at least one flange means with said at least one retaining surface.

5. A device according to claim 1, further comprising key means for securing said plunger means with respect to said guide assembly.

6. A device according to claim 5, further comprising dowel means for mounting said plunger means on said key means.

7. A device according to claim 6, further comprising key pin means for securing said key means on said guide assembly.

8. A device according to claim 1, wherein said stripper assembly comprises:
   a planar portion: and
   an annular portion extending from said planar portion.

9. A device according to claim 8, further comprising a punch aperture formed in said planar portion of said stripper assembly.

10. A device for selectively securing a stripper assembly on a punch guide assembly, said device comprising:
    a stripper assembly including a locator slot; and
    a resiliently biased plunger assembly disposed adjacent said guide assembly and capable of selective engagement with said locator slot to maintain said stripper assembly in a predetermined rotational position relative to said guide assembly;
    said plunger assembly being reciprocable in a direction substantially parallel to a longitudinal axis of said guide assembly;
    whereby engagement of said plunger assembly in said locator slot prevents relative rotation of said guide assembly with respect to said stripper assembly.

11. A device according to claim 10, wherein said stripper assembly comprises an annular portion and said locator slot extends axially into and radially through said annular portion.

12. A device for selectively securing a stripper assembly on a punch guide assembly, said device comprising:
    a stripper assembly including at least one retaining projection and at least one locator slot;
    at least one flange disposed on said guide assembly and adapted to cooperate with said annular lip and said at least one retaining projection of said stripper assembly to secure said stripper assembly against axial movement relative to said guide assembly; and
    a plunger assembly disposed on said guide assembly and capable of selective engagement with said at least one locator slot to maintain said stripper assembly in a predetermined rotational position relative to said guide assembly;
    whereby engagement of said plunger assembly in said locator slot prevents relative rotation of said guide assembly with respect to said stripper assembly.

13. A device according to claim 12, wherein said plunger assembly comprises the following:
    a key member secured to said guide assembly;
    a reciprocable plunger mounted between said key member and said guide assembly and capable of engagement with said at least one locator slot; and
    a spring mounted to bias said plunger toward engagement with said at least one locator slot.

14. A device according to claim 13, wherein said plunger includes a longitudinal aperture open toward said key member, and said key member includes a dowel extending into said longitudinal aperture.

15. A device according to claim 14, wherein said key member is secured to said guide assembly with a key pin.

16. A device according to claim 12, wherein said at least one flange of said guide assembly comprises a plurality of flanges disposed at regular intervals around an outer periphery of said guide assembly, and wherein said at least one retaining projection of said stripper assembly comprises a plurality of retaining projections disposed at regular intervals around an inner periphery of said stripper assembly.

17. A device according to claim 16, wherein said plurality of flanges are disposed diametrically opposite one another around said outer periphery of said guide assembly, and wherein said plurality of retaining projections are disposed diametrically opposite one another around said inner periphery of said stripper assembly.

18. A method of securing a stripper assembly to a punch guide assembly, said method comprising the following steps:
    providing said guide assembly with at least one flange and a reciprocable plunger;
    providing said stripper assembly with at least one retaining projection engageable with said at least one flange, and at least one locator slot adapted to receive said plunger;
    placing said stripper assembly on said guide assembly; and
    affecting relative movement between said stripper assembly and said guide assembly to cause said at least one retaining projection to engage said at least one flange, and said plunger to be received in said at least one locator slot;

whereby, when said plunger is received in said at least one locator slot, relative rotation of said guide assembly with respect to said stripper assembly is prevented.

19. A method according to claim 18, wherein said step of affecting relative movement between said stripper assembly and said guide assembly comprises affecting relative rotational movement between said stripper assembly and said guide assembly.

20. A method of securing a stripper assembly to a punch guide assembly, and of removing a stripper assembly from a punch guide assembly, said method comprising the following steps:

providing said guide assembly with at least one flange and a selectively actuable reciprocable plunger;

providing said stripper plate with at least one retaining projection engageable with said at least one flange, and at least one locator slot adapted to receive said plunger;

placing said stripper assembly on said guide assembly;

affecting a first relative movement between said stripper assembly and said guide assembly to cause said at least one retaining projection to engage said at least one flange, and said plunger to e received in said at least one locator slot, whereby, when said plunger is received in said at least one locator slot, relative rotation of said guide assembly with respect to said stripper assembly is prevented;

actuating sad plunger to a position out of said at least one locator slot;

affecting a second relative movement between said stripper assembly and said guide assembly to cause said at least one retaining projection to disengage said at least one flange; and removing said stripper assembly from said guide assembly.

* * * * *